United States Patent
McNall

[15] 3,658,068
[45] Apr. 25, 1972

[54] METHOD OF TREATING HYPERBILIRUBINEMIA

[72] Inventor: John W. McNall, West Orange, N.J.
[73] Assignee: Westinghouse Electric Corporation, Pittsburgh, Pa.
[22] Filed: Dec. 17, 1969
[21] Appl. No.: 885,812

[52] U.S. Cl. ............................................................128/395
[51] Int. Cl. ......................................................A61n 5/00
[58] Field of Search.........128/362, 395, 396, 1.02, 371–376; 252/301.4 P

[56] References Cited

UNITED STATES PATENTS

| | | | |
|---|---|---|---|
| 3,544,483 | 12/1970 | Lagos | 252/301.4 |
| 3,509,065 | 4/1970 | Palilla | 252/301.4 |
| 3,484,383 | 12/1969 | Hoffman | 252/301.4 |

OTHER PUBLICATIONS

Cremer, R. J., et al., The Lancet, May 24, 1958, pp. 1094–1097.
Philips Res. Reports, Vol. 22, 1967, pp. 355–366.
Broughton, P. M. G., et al., Archives of Diseases in Childhood, Vol. 40, 1965, pp. 666–671.
Lucey, J., et al., Pediatrics, Vol. 41, No. 6, June 1968, pp. 1047–1054.

Primary Examiner—Richard A. Gaudet
Assistant Examiner—Kyle L. Howell
Attorney—A. T. Stratton, W. D. Palmer and Walter Sutcliff

[57] ABSTRACT

An improved method of treating infantile hyperbilirubinemia by irradiating the subject with the radiation produced by a lamp combination comprising a mercury vapor discharge device having a phosphor coating of alkaline-earth metal halophosphate activated by divalent europium.

4 Claims, 2 Drawing Figures

PATENTED APR 25 1972

3,658,068

WITNESSES:
Leon M. Garman
James F. Young

INVENTOR
John W. McNall
BY Walter Sutcliff
ATTORNEY

METHOD OF TREATING HYPERBILIRUBINEMIA

BACKGROUND OF THE INVENTION

The condition termed hyperbilirubinemia in newborn infants refers to a condition where bilirubin is present in high concentrations such that there is significant red cell destruction. The condition may arise because of a hemolytic disease or simply because the immature infant had difficulty in eliminating the bilirubin. The standard treatment for this condition is to transfuse the infant.

Several researchers have reported on the effects of phototherapy on infants exhibiting the condition, e.g., J. Lucey; M. Ferriero; J. Hervitt; *Prevention of Hyperbilirubinemia of Prematurity by Phototherapy*, Pediatrics, vol. 41, pages 1047–1054, (1968); and P.M.G. Broughton; E. J. Rossiter; C. B. Warren; G. Goulis; *Effect of Blue Light on Hyperbilirubinemia* Arch. Dis. Child, vol. 40, page 666, (1965).

The family of luminescent compositions of alkaline-earth metal halophosphate activated by divalent europium is described in copending application Serial No. 726,464 filed May 3, 1968, and owned by the assignee of the present invention. In general these compositions are very efficiently excited by ultraviolet radiations over a broad range of wavelengths. The compositions can be advantageously utilized with a low pressure mercury vapor discharge, which produces principally 254 nm radiation, and the compositions emit as narrow band blue emitters. The peak wavelength and the half-width of the radiation band is determined by the particular alkaline-earth metal or combination of same used. The following table gives the emission data for specific chlorophosphate members of the family of compositions:

TABLE I

| % Sr | % Ba | % Ca | Peak (nm) | Half-width (nm) |
|---|---|---|---|---|
| 100 | — | — | 446.5 | 33 |
| — | — | 100 | 452 | 37.5 |
| — | 100 | — | 436 | 38 |
| 80 | — | 20 | 448.5 | 40.5 |
| 20 | — | 80 | 457 | 42 |
| 80 | 20 | — | 448 | 37 |
| 20 | 80 | | | |
| — | | | 464 | 85 |
| 60 | 20 | 20 | 451 | 56 |
| 33.3 | 33.3 | 33.3 | 456 | 80 |

The europium content can be readily varied so that the gram-atom ratio of europium to total metal, i.e., europium to europium plus alkaline-earth metal, is from about $3.5 \times 10^{-3}$ to $3.5 \times 10^{-2}$. The composition which has been found preferable from the standpoint of best efficiency and narrowest bandwidth of emission is $Sr_5(PO_4)_3Cl:Eu$, wherein the gram-atom ratio of europium to europium plus strontium is about $1.5 \times 10^{-2}$. The chlorine can be substituted for in whole or in part by bromine and/or fluorine.

SUMMARY OF THE INVENTION

It has been discovered that a lamp combination comprising a mercury vapor discharge device incorporating a phosphor of alkaline-earth metal halophosphate activated by divalent europium is particularly useful in the treatment of hyperbilirubinemia. This treatment is particularly advantageous because of the concentration of the radiated energy in a portion of the spectrum which is particularly advantageous in causing decomposition of the bilirubin constituent. The particular phosphor is highly absorptive of long wavelength ultraviolet radiations and this energy is reemitted as the narrow band blue emission. The blue emitting lamps used in this treatment process exhibit a maintenance of blue emission which is about 100 percent better than the blue lamps used in prior art treatment.

BRIEF DESCRIPTION OF THE DRAWINGS

For a better understanding of the invention, reference may be had to the exemplary embodiment shown in the accompanying drawings in which.

DESCRIPTION OF THE PREFERRED EMBODIMENT

Figure 1:
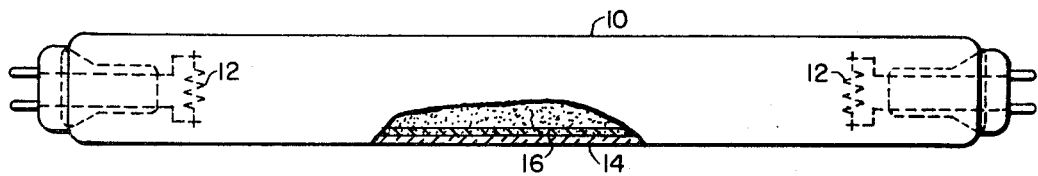
FIG. 1 is a standard low pressure mercury vapor device incorporating the strontium chlorophosphate composition activated by divalent europium.

In practicing the present invention, a lamp 10 as seen in FIG. 1 was prepared. This is a standard low pressure mercury vapor discharge device, with a phosphor coating 16 on the interior of the soft glass envelope 14. Standard operating electrodes 12 are disposed at each end of the lamp. The phosphor is strontium chlorophosphate activated by divalent europium as described earlier. The lamp 10 is a 20 watt lamp which is about 24 inches long and about 1½ inches in diameter. The lamp includes a standard mercury and rare gas dosage. The mercury discharge primarily produces 254 nanometer radiation which excites the phosphor to luminescence.

In practicing the treatment process about 10 of these 20 watt lamps have been disposed in a unitary fixture which has an ultra-violet absorptive cover. This is to prevent exposure of the infant to the potentially dangerous ultra-violet radiation, even though the strontium chlorophosphate phosphor is itself highly absorptive of ultra-violet radiations. The eyes of the infant to be treated are also covered with a suitable light shield to prevent any retinal damage from the high intensity radiation. It has been found convenient to dispose the infant a distance from the fixture such that the energy level at the peak emitted wavelength reaching the infant is about 90 microwatts per square centimeter per nanometer. The effectiveness of the treatment using the lamp combination described has been observed in both in vivo and in vitro testing. The in vitro testing comprised taking a blood sample from an infant exhibiting hyperbilirubinemia, buffering in its solution, and irradiating the sample with a variety of lamps ranging from a standard fluorescent lamp to a commercially available blue emitting calcium tungstate lamp, wherein the emission was a broad band of from 390–560 nm with a peak at about 435 nm. It has been determined that treatment using the strontium chlorophosphate phosphor containing lamp combination described herein was substantially speeded, with the rate of decline of serum bilirubin concentration being about three times greater than with the best of the prior art lamp combinations. It should be pointed out that time considerations are very important in treating the condition, since continued high bilirubin concentrations can cause extensive tissue damage.

The in vivo testing supported the data of the in vitro tests, and there was markedly quicker improvement in the infants when the treatment was carried out with the lamp combination specified herein. The lamp combination using the strontium chlorophosphate exhibits a very high maintenance of emission, being of the order of about 95 percent of zero hour output at 500 hours, and 94 percent of zero hour output at 1,000 hours. The test results supporting the utility of the lamp combination were more completely reported in a paper presented before the American Pediatric Society, May 3, 1969, at Atlantic City, New Jersey, titled *The Photobiologic Effects of Hyperbilirubinemia*, authored by Thomas R. C. Sisson, M.D.; Norman Kendall, M.D.; Ronald E. Davies, Ph.D; and Danield Berger, M.E.E. The tests were conducted under the auspices of Temple University School of Medicine.

Figure 2:
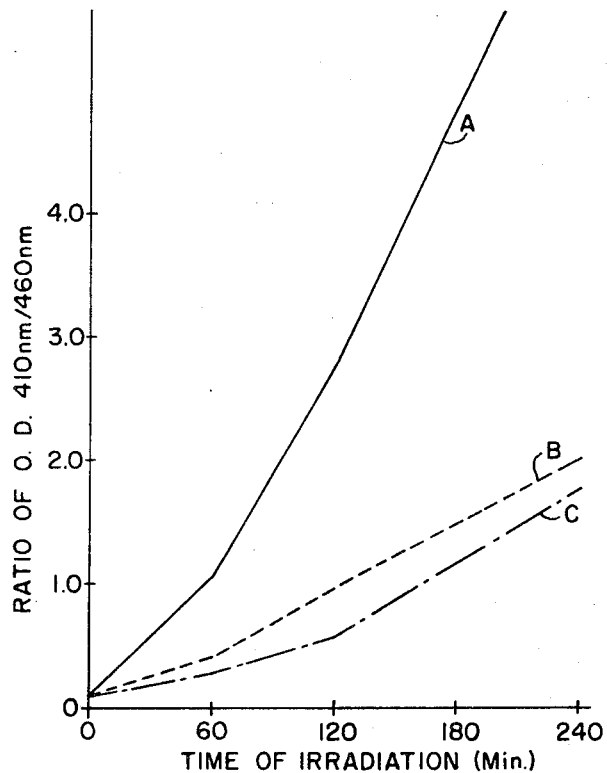
FIG. 2 is a plot of the ratio of optical density of a serum sample at 410 nm to 460 nm radiation, against treatment time in minutes for specific lamp combination.

The data exhibited in FIG. 2 is a measure of decrease of bilirubin in a buffered serum sample. The ratio of optical density of the serum sample to 410 nm and 460 nm is plotted against the time of irradiation from the europium activated strontium chlorophosphate in curve A. Curve B traces the effect using a standard blue fluorescent lamp using commercial calcium tungstate phosphor, and curve C shows the effect using a commercial daylight fluorescent lamp. This ratio is plotted because the approximate absorption peak for hemoglobin is about 410 nm, and for bilirubin at about 460 nm. Thus, as the ratio increases with the hemoglobin remaining fairly constant the bilirubin is decomposing. This data clearly demonstrates the benefits obtained by the present treatment.

While the invention has been described with respect to an embodiment utilizing a low pressure mercury vapor discharge device, a standard high pressure mercury vapor discharge device could also be used to excite the phosphor. The strontium chlorophosphate phosphor is also efficiently excited by the shorter wavelength radiation produced in such high pressure mercury discharge devices. The phosphor would be conveniently coated on the interior of the outer bulbous envelope in which the arc tube is mounted as is well known. Of course precautions against exposure of the infant to the high energy short wavelength ultraviolet radiation would be needed.

I claim:

1. An improved method of in vivo treatment of infants having hyperbilirubinemia, said method comprising; irradiating the infant subject with the emission produced by a lamp combination comprising at least one mercury vapor discharge device having a phosphor coating of alkaline-earth metal halophosphate activated by divalent europium, and shielding the eyes of said infant subject during said irradiation.

2. The method as specified in claim 1, wherein the phosphor utilized is strontium chlorophosphate, activated with divalent europium in an amount such that the gram-atom ratio of europium to europium plus strontium is about $1.5 \times 10^{-2}$.

3. The method as specified in claim 1, wherein said phosphor is $Sr_5(PO_4)_3 Cl:Eu$, wherein the gram-atom ratio of europium to europium plus strontium is from about $3.5 \times 10^{-3}$ to $3.5 \times 10^{-2}$.

4. The method as specified in claim 3, wherein said lamp combination comprises about 10 of said devices each of which has a nominal 20 watt rating, said lamp combination is disposed at a distance from said infant subject such that the energy level reaching said infant subject is about 90 microwatts per square centimeter per nanometer, and wherein said lamp combination utilizes an ultra-violet absorptive cover.

* * * * *